(12) United States Patent
Albisu et al.

(10) Patent No.: US 12,003,497 B2
(45) Date of Patent: *Jun. 4, 2024

(54) WEBSITE VERIFICATION SERVICE

(71) Applicant: AT&T Intellectual Property I, L.P., Atlanta, GA (US)

(72) Inventors: Luis Albisu, Woodbridge, VA (US); Manuel Ortiz, Jr., Easton, PA (US); Daniel Solero, Rockwall, TX (US); Michael Maglione, Skillman, NJ (US); Katie Alvarez, Denver, CO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,272

(22) Filed: Dec. 29, 2022

(65) Prior Publication Data
US 2023/0147743 A1 May 11, 2023

Related U.S. Application Data

(63) Continuation of application No. 16/710,303, filed on Dec. 11, 2019, now Pat. No. 11,575,666.

(51) Int. Cl.
*H04L 9/40* (2022.01)
*G06F 16/9536* (2019.01)
(Continued)

(52) U.S. Cl.
CPC ...... *H04L 63/0823* (2013.01); *G06F 16/9536* (2019.01); *G06F 16/9577* (2019.01); *G06K 7/1417* (2013.01); *H04L 63/102* (2013.01)

(58) Field of Classification Search
CPC combination set(s) only.
See application file for complete search history.

(56) References Cited

U.S. PATENT DOCUMENTS 6,532,541 B1 3/2003 Chang
8,225,383 B1 7/2012 Channakeshava
(Continued)

OTHER PUBLICATIONS

Sonia Flores et al. "Formal Verification of Websites," 2008, pp. 103-118. (Year: 2008).*
(Continued)

*Primary Examiner* — Luu T Pham
*Assistant Examiner* — Canh Le
(74) *Attorney, Agent, or Firm* — GUNTIN & GUST, PLC; Dana Lemoine

(57) ABSTRACT

The concepts and technologies disclosed herein are directed to a website verification service. A system can receive, from a web server that hosts a website, a query for a set of authentication credentials ("credentials") to be used to verify that the website is trustworthy. The system can generate and provide the credentials to the web server. The web server can, in turn, provide the credentials to a web browser device for presentation to a user via a web browser application executing on the web browser device. The system also can provide the credentials to a verifier device. The verifier device can present the credentials to the user via a verifier application executing on the verifier device. The user can compare the credentials presented via the web browser application to the credentials presented via the verifier application executing on the verifier device to determine whether the website can be trusted.

17 Claims, 14 Drawing Sheets

(51) Int. Cl.
*G06F 16/957* (2019.01)
*G06K 7/14* (2006.01)

(56) References Cited

U.S. PATENT DOCUMENTS

| | | | |
|---|---|---|---|
| 8,996,485 | B1 | 3/2015 | Krishnamurthy |
| 9,282,107 | B1 | 3/2016 | Ran |
| 2003/0115154 | A1* | 6/2003 | Anderson ............ G06Q 20/382 705/73 |
| 2007/0162963 | A1 | 7/2007 | Penet |
| 2011/0197266 | A1 | 8/2011 | Chu |
| 2012/0005311 | A1* | 1/2012 | Livingston .......... G06F 21/6218 709/219 |
| 2012/0109941 | A1 | 5/2012 | Cohen |
| 2013/0219479 | A1* | 8/2013 | DeSoto .................. H04L 63/10 726/6 |
| 2014/0304774 | A1* | 10/2014 | Bejerasco ............... G06F 21/62 726/3 |
| 2015/0288670 | A1* | 10/2015 | Bhooshan .......... H04L 12/6418 726/5 |
| 2015/0310194 | A1* | 10/2015 | Zhang .................... G06F 21/31 726/9 |
| 2016/0127408 | A1 | 5/2016 | Miu |
| 2016/0277399 | A1* | 9/2016 | Du ........................ H04N 23/00 |
| 2017/0039612 | A1* | 2/2017 | Satyanarayana .......... G06K 5/00 |
| 2019/0068549 | A1* | 2/2019 | Lakshmanan ....... G06F 16/9535 |
| 2019/0394210 | A1* | 12/2019 | Han .......................... H04L 9/32 |
| 2020/0358781 | A1 | 11/2020 | Edwards |
| 2021/0004995 | A1 | 1/2021 | Burg |
| 2021/0051004 | A1* | 2/2021 | Wissman .............. H04L 9/0825 |
| 2022/0294797 | A1* | 9/2022 | Edwards ................. H04L 63/10 |

OTHER PUBLICATIONS

T. M. El-Sakka, "Real-Time Interactive Verification of Quran Words in The Web Contents," 2013, pp. 12-17 (Year: 2013).*
Liliana Alexandre et al., "Filtering XML content for Publication and Presentation on the Web," 2011, pp. 85-89. (Year: 2011).
Ji-Hee Jeoung et al., "Systematic WEbsite Verification for Privacy Protection," 2008, pp. 231-234. (Year: 2008).
U.S. Office Action dated Feb. 15, 2022 in U.S. Appl. No. 16/710,303.
U.S. Notice of Allowance dated Sep. 9, 2022 in U.S. Appl. No. 16/710,303.
U.S. Notice of Allowance dated Sep. 22, 2022 in U.S. Appl. No. 16/710,303.

* cited by examiner

WEBSITE VERIFICATION SERVICE

CROSS-REFERENCE TO RELATED APPLICATIONS

This application is a continuation of and claims priority to U.S. patent application Ser. No. 16/710,303, entitled "Website Verification Service," filed Dec. 11, 2019, now allowed, which is incorporated herein by reference in its entirety.

BACKGROUND

In recent years, the frequency and sophistication of cyber-attacks have increased significantly. Denial-of-service ("DoS"), distributed denial-of-service ("DDoS"), man-in-the-middle, phishing, eavesdropping, and password attacks, among others, target businesses and individuals alike. This is due, in part, to the ubiquitous nature of Internet use for many aspects of our daily routines, including email and other text-based communications, social networking, finance, online commerce, and the like. Users typically access websites they think are trustworthy and freely provide their authentication credentials to "log-in" and may therefore unknowingly access a website that is under attack.

Most cyber security mechanisms are user-focused. In other words, a user is required to provide authentication credentials, such as a username and password, but the website that requests authentication credentials from the user is not required to provide its own authentication credentials to verify its authenticity to the user. Many websites rely on a certificate authority to verify that a website actually belongs to a specific entity. However, sophisticated cyber-attacks can spoof valid certificates or may utilize other attack mechanisms to circumvent or otherwise compromise the security provided by a certificate authority.

SUMMARY

Concepts and technologies disclosed herein are directed to a website verification service. According to one aspect of the concepts and technologies disclosed herein, a website verification system can receive, from a web server that hosts a website, a query for a set of authentication credentials to be used to verify that the website is trustworthy. The website verification system can generate and provide the credentials to the web server. The web server can, in turn, provide the set of authentication credentials to a web browser device for presentation to a user via a web browser application executing on the web browser device. The website verification system also can provide the set of authentication credentials to a verifier device. The verifier device can present the set of authentication credentials to the user via a verifier application executing on the verifier device. The user can compare the set of authentication credentials presented via the web browser application to the set of authentication credentials presented via the verifier application executing on the verifier device to determine whether the website can be trusted.

In some embodiments, the website verification system can register the website for a website verification service. The website verification system can receive, from the web server, a request to register the website. The website verification system can register the website for a website verification service ("WVS"). In some embodiments, the website verification system includes a WVS website registrar that can store information that identifies the website (e.g., one or more web links) and/or the web server (e.g., one or more IP addresses) in association with the set of website authentication credentials.

In some embodiments, the set of authentication credentials includes an image. The image, in some embodiments, can form part of a temporal sequence. The temporal sequence can include a plurality of images that demonstrate a change over time. For example, the plurality of images might include pictures depicting a process over time of a tadpole becoming a frog or a baby becoming a toddler, a teenager, and eventually an adult. In this manner, additional security can be provided if any one or more of the pictures in a given sequence is/are compromised. In some other embodiments, the website authentication system can create a relative size comparison of objects depicted in a set of pictures. For example, the set of pictures might include pictures depicting the sun as being larger than Jupiter which is larger than Earth which is larger than the moon.

In some embodiments, the set of website authentication credentials can include a sound. The sound may accompany an image. For example, a picture of a cow might be accompanied by a "moo" sound. In some embodiments, the set of website authentication credentials can include a tactile output, which may be embodied as a sequence of dots represented by buzzes of varying strength and/or length. In embodiments where temporal sequencing is used, the website verification service and the verifier device can be synchronized, at least in part, via a WVS timer maintained by the website verification system.

In some embodiments, the set of website authentication credentials is randomly generated. In some embodiments, the set of authentication credentials can include a code and an image. The code can include any combination of letters, numbers, characters, and/or symbols. The image can be randomly generated from pre-defined assets. Alternatively, the image may be selected from a repository of images that is stored locally by the website verification system or remotely accessible by the website verification system such as via an image database stored on or in association with another system that is accessible directly by the website verification system via a communications link, via HTTP, or some other method. The website verification system can generate the website authentication credentials via selection of pre-determined credentials (e.g., codes and images as described above).

In some embodiments, a code and an image can be provided to the verifier device. The verifier device can present the code and the image to the user via the verifier application executing on the verifier device. The web browser device can present to the user via the web browser application executing on the web browser device the image only in response to input of the code presented on the verifier device matching the code received from the website verification system.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

DETAILED DESCRIPTION

Figure 1:
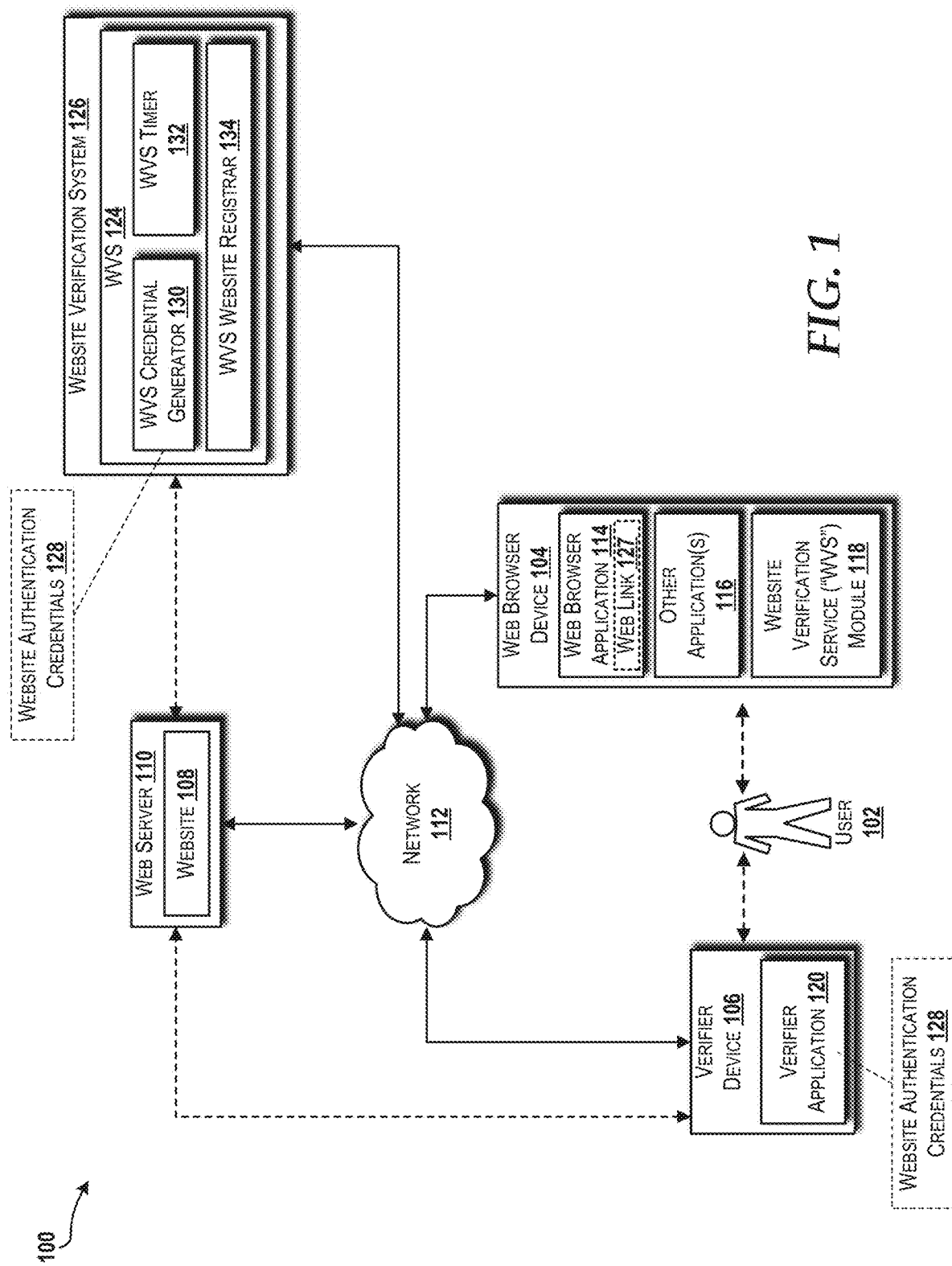
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for venue seat assignment based upon hearing profiles will be described.

Referring now to FIG. 1, aspects of an illustrative operating environment 100 for various concepts disclosed herein will be described. It should be understood that the operating environment 100 and the various components thereof have been greatly simplified for purposes of description. Accordingly, additional or alternative components of the operating environment 100 can be made available without departing from the embodiments described herein.

The illustrated operating environment 100 includes a user 102 who is shown being in association with two devices—a web browser device 104 and a verifier device 106. In this context, "in association with" means the web browser device 104 and the verifier device 106 are in the user's possession, on the user's person, or the like; that the user 102 is an owner of the web browser device 104 and/or the verifier device 106; and any other arrangement that may define this "association." The user 102 can include any individual or other entity who would like to access a website 108 that is hosted by a web server 110. The web server 110, and therefore, the website 108, is accessible via a network 112. In this manner, while the user 102 is described herein as a human person, the term "user" is intended to encompass other entities, such as machines, robots, other systems or devices, or any other entity that may request access to the website 108. As such, the embodiment of the user 102 as a human person should not be construed as being limiting in any way.

According to various embodiments, the functionality of the web browser device 104 and the verifier device 106 each can be provided by one or more mobile telephones, smartphones, tablet computers, slate computers, smart watches, fitness devices, smart glasses, other wearable devices, mobile media playback devices, set top devices, navigation devices, laptop computers, notebook computers, ultrabook computers, netbook computers, server computers, computers of other form factors, computing devices of other form factors, other computing systems, other computing devices, Internet of Things ("IoT") devices, other unmanaged devices, other managed devices, and/or the like. It should be understood that the functionality of the web browser device 104 and the verifier device 106 each can be provided by a single device, by two or more similar devices, and/or by two or more dissimilar devices. In the illustrated example, the web browser device 104 is configured to execute a web browser application 114, one or more other applications 116, and a website verification service ("WVS") module 118. The verifier device 106 is configured to execute a verifier application 120.

The web browser device 104 and the verifier device 106 each can include hardware components, such as one or more processing components, one or more memory components, one or more networking components, and/or other hardware components. An example of the web browser device 104 and the verifier device 106 embodied as a mobile device, such as a smartphone, is illustrated and described below with reference to FIG. 9. An example of the web browser device 104 and the verifier device 106 embodied as a computer system, such as a personal computer or the like, is illustrated and described below with reference to FIG. 8. In some embodiments, the web browser device 104 is a computer system, such as a personal computer, and the verifier device 106 is a mobile device, such as a smartphone, tablet, or smart watch. These embodiments are used herein to simplify explanation and should not be construed as being limiting in any way.

The website 108 hosted by the web server 110 can be or can include any number of web pages, in any arrangement, and can utilize any web development language or combination of languages to provide the front-end and back-end components of the website 108. For example, the web development languages can include one or more markup languages such as extensible markup language ("XML"), hypertext markup language ("HTML"), and/or cascading-style sheet ("CSS"), and one or more programming languages such as JavaScript, TypeScript, C, C++, PHP, and/or Python. Those skilled in the art will appreciate the different combinations of web development languages that can be used to develop and maintain the website 108. Moreover, the examples mentioned above are some popular examples currently used in web development and should not be construed as limiting development of the website 108 to any particular language or combination of languages currently available or available in the future.

The web server 110 can be or can include any combination of hardware and/or software to host, at least in part, the website 108 and to facilitate communications between the web browser device 104 and the web server 110 via hypertext transfer protocol ("HTTP"). The web server 110 can be a standalone server that is hardware and/or software-based or can be part of server cluster or other arrangement. In some embodiments, the web server 110 is hosted by a cloud computing platform such as the exemplary example described herein below with reference to FIG. 11. Moreover, the web server 110 can utilize any server-side web programming languages, some examples of which are listed above.

The network 112 can encompass any and all networks used to enable communications between any combination of the web browser device 104, the verifier device 106, the web server 110, and the website verification system 126. As such, the network 112 can include any combination of access networks, mobile communications networks (e.g., a cellular network), IP networks, and the Internet, for example. An exemplary embodiment of the network 112 is illustrated and described herein with reference to FIG. 10.

The web browser device 104 can access the website 108 hosted by the web server 110 via a web link 127 (such as an HTTP link). The web link 127 can be provided to the web browser application 114 via direct input such as the user 102 entering the web link 127 into a dedicated graphical user interface ("GUI") element (e.g., search bar) of the web browser application 114. The web link 127 can be provided to the web browser application 114 by one or more of the other applications 116. The other applications 116 can include any application that can be executed by the web browser device 104. For ease of explanation, and not limitation, the other application 116 will be described herein as an email application that is configured to communicate with one or more email servers (not shown) to obtain email messages associated with one or more email accounts. An email application may present an email message that includes the web link 127, and upon selection by the user 102, the web browser application 114 will attempt to request the website 108 from the web server 110 via the HTTP address specified in the web link 127. The web link 127 can be embedded in other websites (not shown), in social media messages, chat messages, short messaging service ("SMS") messages, Internet-based messages, any combination thereof, and/or the like.

The website verification service ("WVS") module 118 enables functionality described herein to ensure that the website 108 can be verified for the user 102 by a WVS 124 provided, at least in part, by a website verification system 126. The WVS 124 is a verification service used to verify the authenticity of the website 108 for the user 102 by using pictures, sounds, codes (e.g., letters, numbers, characters, symbols, or any combination thereof), tactile output, or some combination thereof. The WVS 124 utilizes an alternate channel for verification to compare what the website 108 presents to the user 102 via the web link 127 accessed by the web browser application 114 versus what is expected (i.e., the actual content of the website 108 hosted by the web server 110). The alternate channel is illustrated and described herein as being implemented, at least in part, via the verifier device 106, and in particular, the verifier device 106 via execution of the verifier application 120.

The verifier application 120, in some embodiments, can receive, from the WVS 124, a set of website authentication credentials 128 (also referred to herein as "website authentication credentials 128") generated by the WVS 124 via a WVS credential generator 130. The website authentication credentials 128 can include any combination of pictures, sounds, codes, tactile output, or some combination thereof. The exemplary examples provided herein will focus on codes and pictures. Sounds can be used if the verifier device 106 includes a sound output device such as a speaker or headphone jack. Tactile output can be used if the verifier device 106 includes a vibration device, haptic feedback device, or some other device that provides tactile output that can be felt by the user 102.

The WVS credential generator 130 can generate the website authentication credentials 128 using a random generator that randomly generates combinations of codes and pictures. A code, as noted above, can include any combination of letters, numbers, characters, and/or symbols. A picture can be randomly generated from pre-defined assets. Alternatively, the picture may be selected from a repository of images that is stored locally by the website verification system 126 or remotely accessible by the website verification system 126 such as via an image database stored on or in association with another system that is accessible directly by the website verification system 126 via a communications link, via HTTP, or some other method. The WVS credential generator 130 can generate the website authentication credentials 128 via selection of pre-determined credentials (e.g., codes and pictures as described above). Those skilled in the art will appreciate the numerous ways the WVS credential generator 130 may generate specific types of website authentication credentials 128. As such, the examples provided herein should not be construed as being limiting in any way.

In some embodiments, the WVS credential generator 130 is configured to apply steganography or other security mechanism to strengthen the verification process for picture-based verification. In some embodiments, the WVS credential generator 130 uses temporal data and/or metadata to increase security of the website authentication credentials 128 and to make it more difficult for artificial intelligence systems to defeat the WVS 124. In some embodiments, the WVS credential generator 130 creates a temporal sequence that can include a set of pictures depicting one or more objects changing over time. For example, the set of pictures might include pictures depicting the process over time of a tadpole becoming a frog or a baby becoming a toddler, a teenager, and eventually an adult. In this manner, additional security can be provided if any one or more of the pictures in a given sequence is/are compromised. In some other embodiments, the WVS credential generator 130 creates a relative size comparison of objects depicted in a set of pictures. For example, the set of pictures might include pictures depicting the sun as being larger than Jupiter which is larger than Earth which is larger than the moon. As mentioned above, the website authentication credentials 128 can include a sound, and in some embodiments, the sound accompanies a picture. For example, a picture of a cow might be accompanied by a "moo" sound. As also mentioned above, the website authentication credentials 128 can include a tactile output, which may be embodied as a sequence of dots represented by buzzes of varying strength and/or length. In embodiments where temporal sequencing is used, the WVS 124 and the verifier device 106 can be synchronized, at least in part, via a WVS timer 132 maintained by the website verification system 126.

The website verification system 126 also includes a WVS website registrar 134. As part of the WVS 124, the web server 110 can register the website 108 for the WVS 124 via the WVS website registrar 134. The WVS website registrar 134 can store information that identifies the website 108 (e.g., one or more web links 127) and/or the web server 110 (e.g., one or more IP addresses) in association with the website authentication credentials 128 generated by the WVS credential generator 130.

The illustrated embodiment of the operating environment 100 includes one user 102, one web browser device 104, one verifier device 106, one website 108, one web server 110, one network 112, one web browser application 114, one WVS module 118, one instance of the WVS 124, one verifier application 120, one website verification system 126, one web link 127, one set of authentication credentials 128, one WVS credential generator 130, one WVS timer 132, and one WVS website registrar 134. It should be understood, however, that some implementations of the operating environment 100 can include multiples of any of the aforementioned elements.

Turning now to FIGS. 2A-2D, GUI diagrams 200A-200D of exemplary user interfaces ("UIs") for implementing aspects to the concepts and technologies disclosed herein will be described, according to illustrative embodiments. The patterns, shapes, fonts, graphics, images, and other design elements of the GUI diagrams are merely intended as examples to aid in explanation of some features disclosed herein. Accordingly, the design of the GUI diagrams should not be construed as being limiting in any way. The GUI diagrams 200A-200D will be described with additional reference to FIG. 1.

Figure 2A:
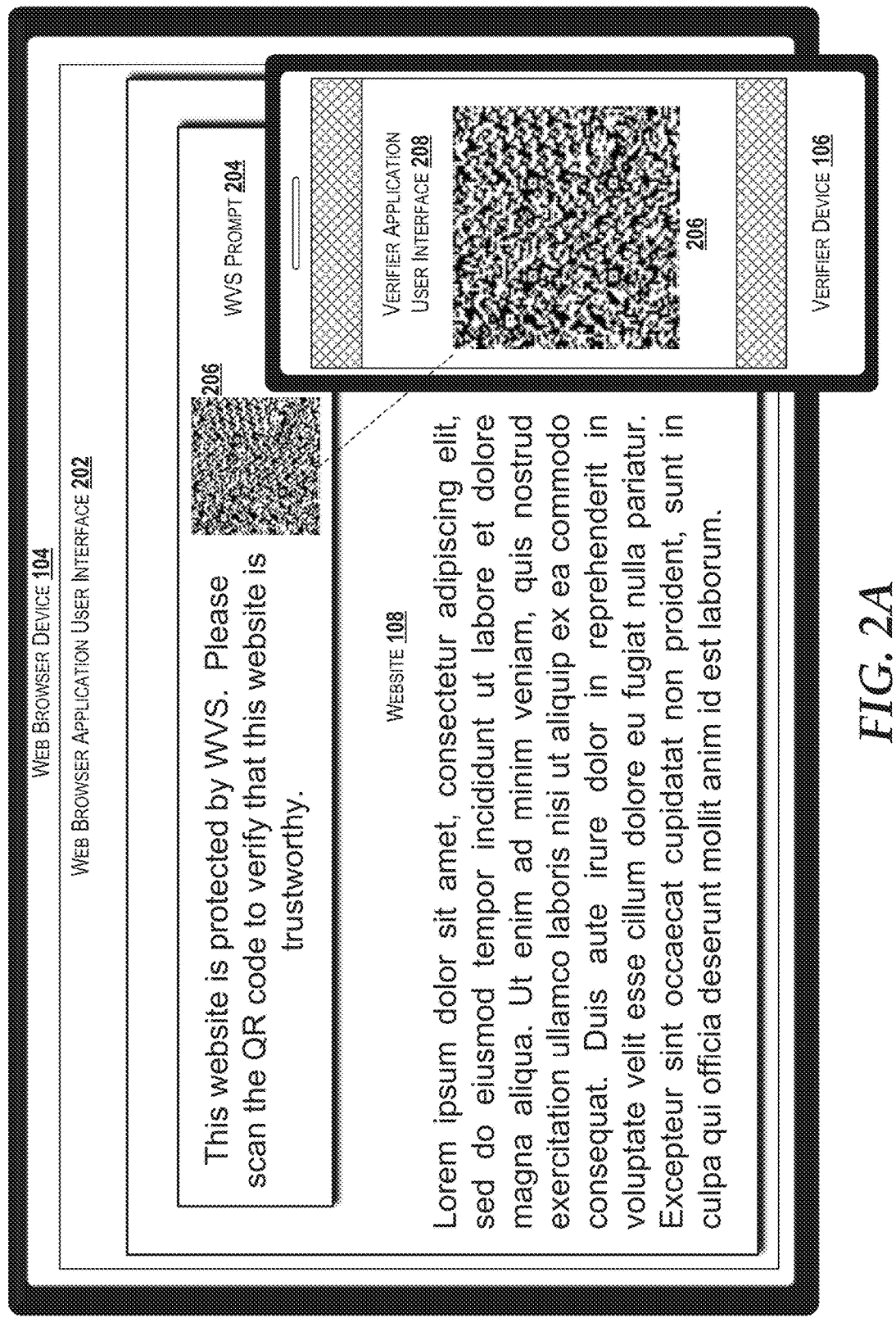
FIGS. 2A-2D are graphical user interface ("GUI") diagrams illustrating aspects of exemplary user interfaces for use in implementing various concepts disclosed herein.

Turning first to FIG. 2A, a first GUI diagram 200A illustrates the web browser device 104 with a web browser application UI 202 presented by the web browser application 114. In particular, the web browser application UI 202 shows the website 108 accessed by the web browser device 104 via the web browser application 114 using the web link 127. The web browser application UI 202 also shows a WVS prompt 204. The WVS prompt 204 notifies the user 102 that the website 108 is protected by the WVS 124 and prompts the user 102 to perform an action to verify that the website 108 is trustworthy.

In some embodiments, the WVS prompt 204 is or contains text, images, videos, sounds, or any combination thereof to prompt the user 102 to initiate the WVS 124. In some other embodiments, the WVS prompt 204 is or contains a 1D, 2D, or 3D barcode that can be scanned by the verifier device 106. For example, as shown in the illustrated embodiment, a camera (best shown in FIG. 9) of the verifier device 106 can be used to scan a 3D barcode 206 (also called a QR code) that is presented to the user 102 as part of the WVS prompt 204. The verifier device 106 can provide visual confirmation that the 3D barcode 206 was successfully scanned via a verifier application UI 208 as shown in the illustrated example.

As explained above, the web server 110 can register the website 108 with the WVS website registrar 134 of the website verification system 126 in preparation for providing the WVS 124 for the web server 110. In some embodiments, the website 108 can utilize an application programming interface ("API") to call the WVS 124 or various functions thereof, including using the WVS credential generator 130 to generate the website authentication credentials 128, enabling or resetting the WVS timer 132, and registering/re-registering the website 108 with the WVS website registrar 134. The same or similar functionality provided by such an API can be implemented instead via a plug-in, extension, or other web development tool.

After the website 108 is registered with the WVS 124 via the WVS website registrar 134 and the user 102 selects, clicks, or otherwise causes the web link 127 to be loaded into the web browser application 114, the website 108 can present the WVS prompt 204 to the user 102. When the user 102 can interact with the WVS prompt 204 via the web browser application UI 200, the web server 110 can connect to the website verification system 126 (e.g., via an API call). This interaction can cause the website verification system 126 to check the WVS website registrar 134 to determine whether the website 108 hosted by the web server 110 is registered for the WVS 124. If so, the WVS 124 can use the WVS credential generator 130 to generate the website authentication credentials 128 and send at least a portion of the website authentication credentials 128 to the web browser device 104 and/or the verifier device 106 in accordance with various embodiments disclosed herein.

Figure 2B:
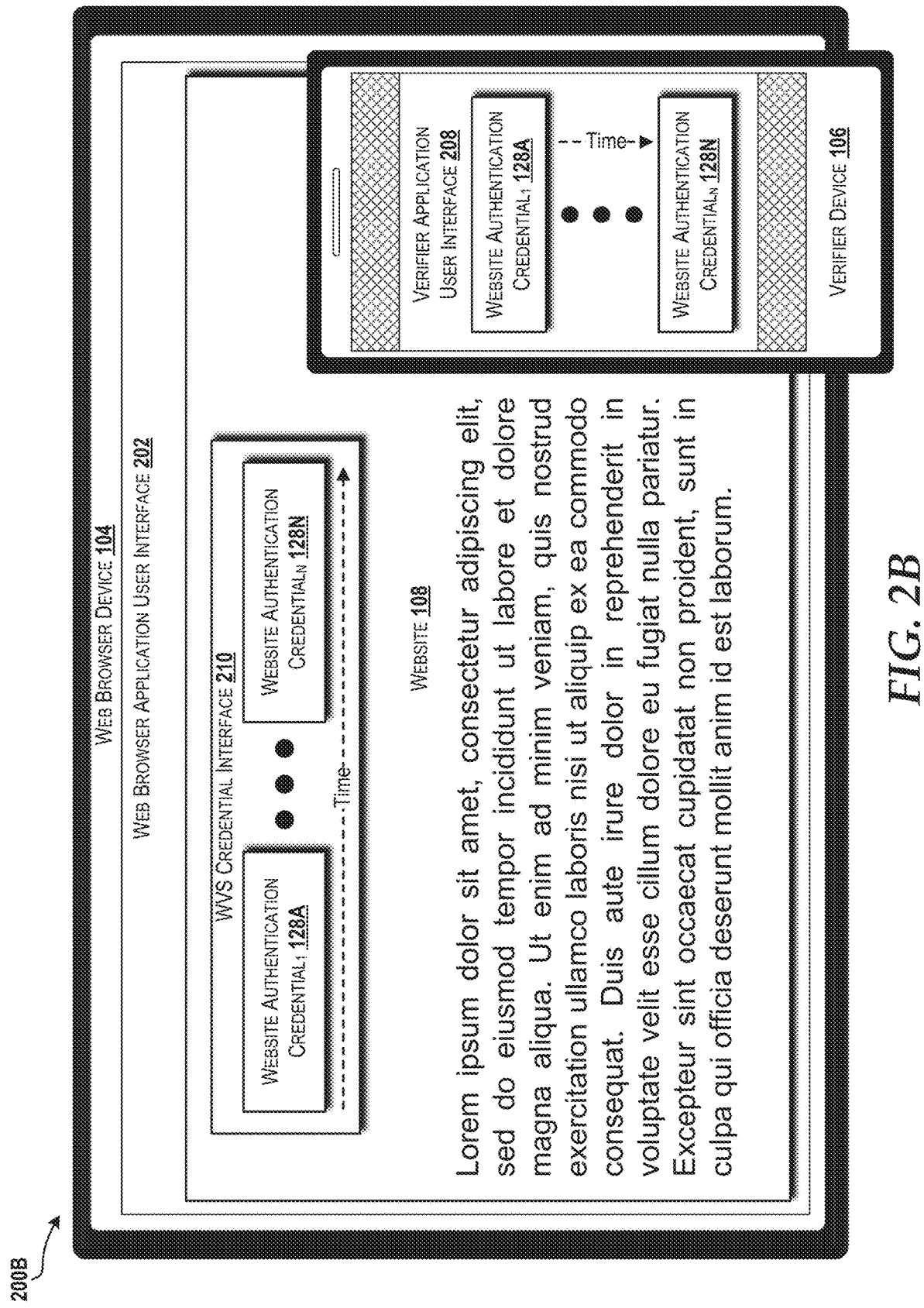

Turning now to FIG. 2B, a second GUI diagram 200B illustrates the web browser device 104 with the web browser application UI 202 presented by the web browser application 114. In particular, the web browser application UI 202 is shown with a WVS credential interface 210 that contains website authentication credentials 128A-128N. For embodiments in which the website authentication credentials 128A-128N form a temporal sequence, a time progression is also shown to illustrate the progression from a first website authentication credential 128A to an $n^{th}$ website authentication credential 128N. The verifier device 106 is shown with the verifier application user interface 208 presented by the verifier application 120. In this example, the verifier application user interface 208 also contains the website authentication credentials 128A-128N. In some embodiments, all of the website authentication credentials 128 can be presented by the web browser device 104 and by the verifier device 106 such that the user 102 can themselves confirm a match of the website authentication credentials 128, and can therefore conclude that the website 108 is trustworthy. Alternatively, in other embodiments, a portion of the website authentication credentials 128, such as a picture, can be presented by the web browser device 104 and another portion of the website authentication credentials 128, such as a code, can be presented on the verifier device 106. An example of these embodiments will now be described with reference to FIG. 2C.

Figure 2C:
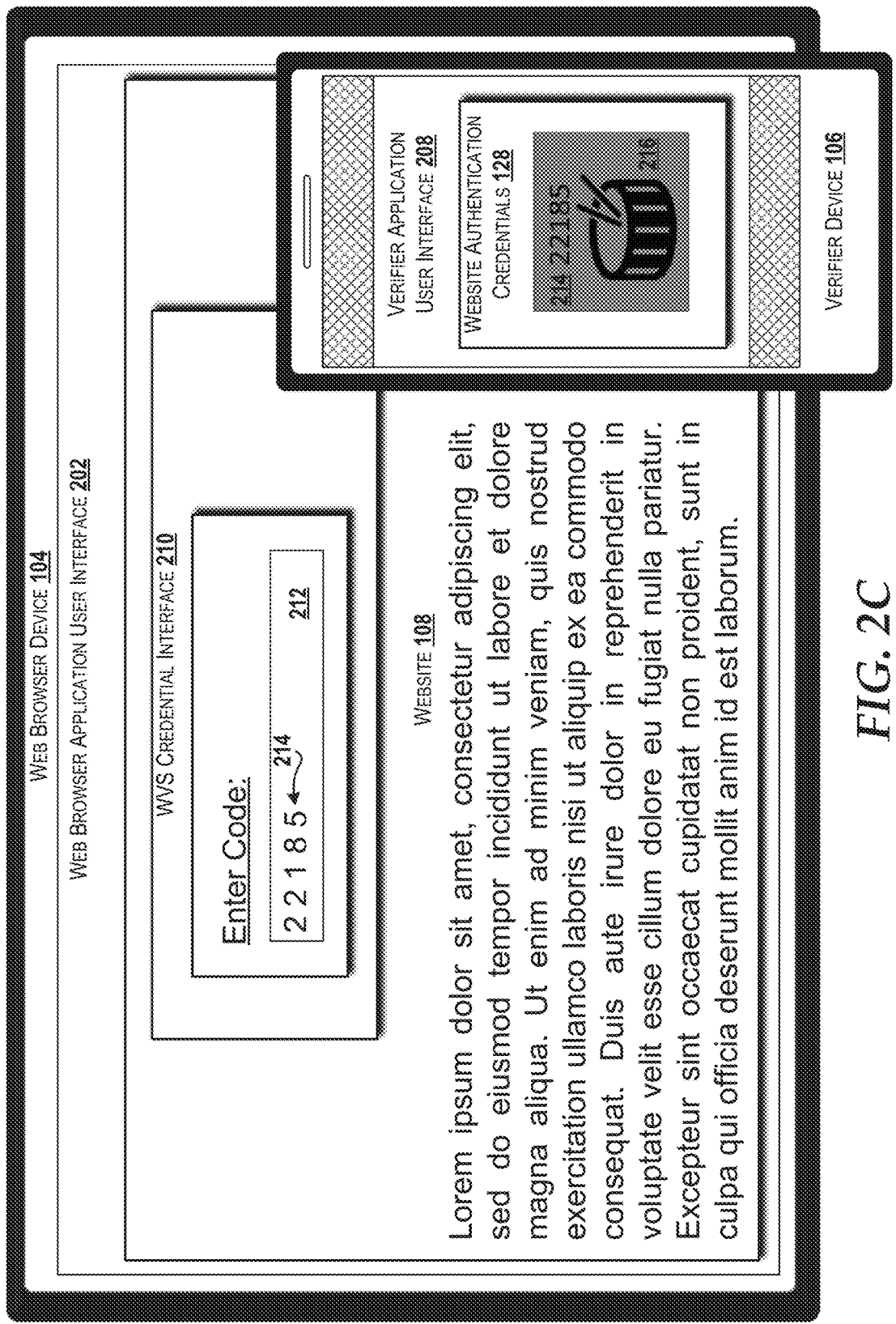

Turning now to FIG. 2C, a third GUI diagram 200C illustrates the web browser device 104 with the web browser application UI 202 presented by the web browser application 114. In particular, the web browser application UI 202 is shown with the WVS credential interface 210. In the illustrated example, the WVS credential interface 210 includes a code field 212. Concurrently, the verifier application UI 208 shows two website authentication credentials 128—a numeric code 214 and an image 216. The user 102 can be instructed to enter the numeric code 214 that is shown in the verifier application UI 208 into the code field 212 of the WVS credential interface 210.

Figure 2D:
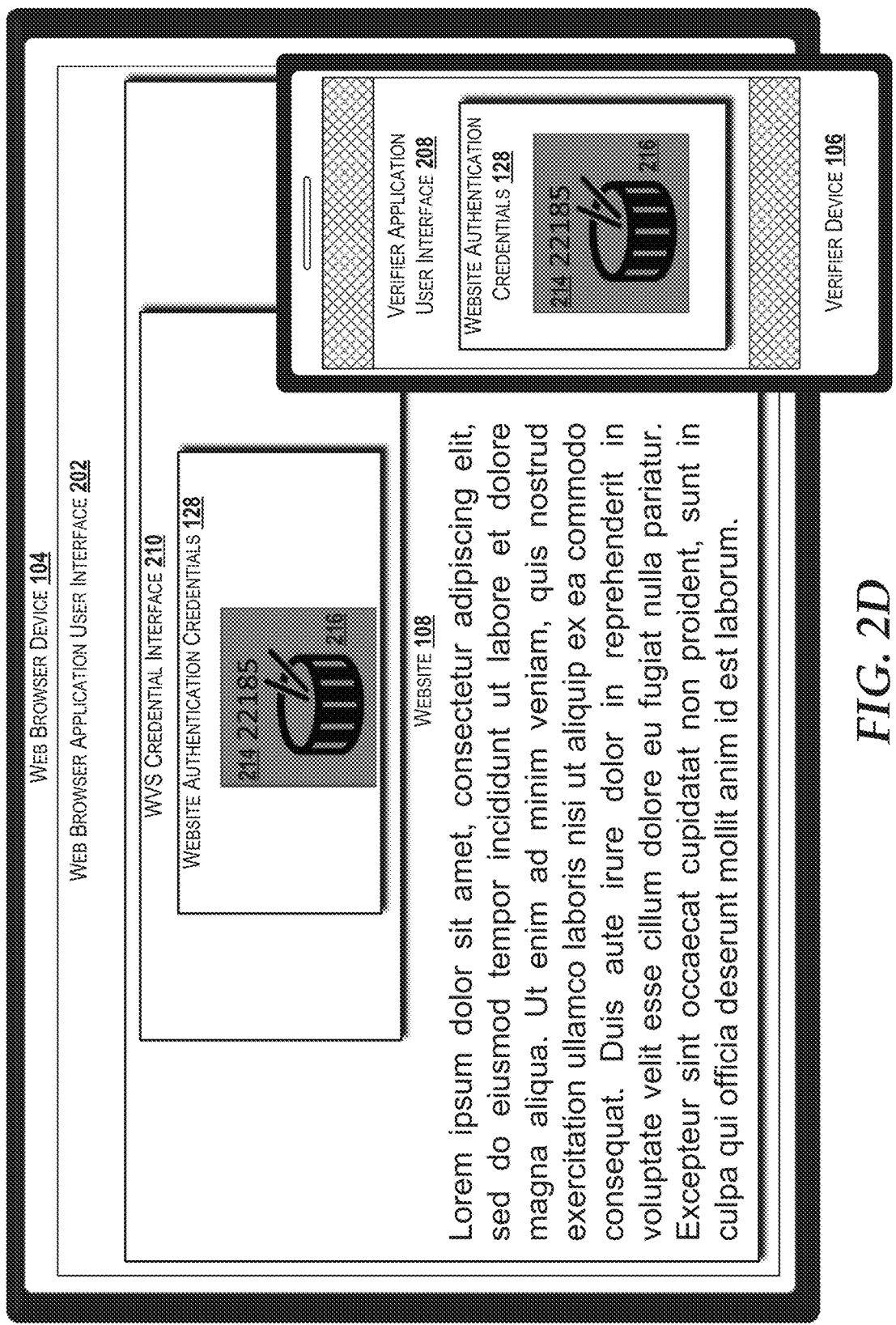

Turning now to FIG. 2D, a fourth GUI diagram 200D illustrates the web browser device 104 with the web browser application UI 202 presented by the web browser application 114. In particular, the web browser application UI 202 is shown with the WVS credential interface 210. In the illustrated example, the WVS credential interface 210 includes the code field 212 with the numeric code 214 entered. After the user 102 enters the numeric code 214 into the code field 212, the image 216 that was previously presented only on the verifier application UI 208 is then presented concurrently on the WVS credential interface 210. If the image 216 presented on the verifier application user interface 208 matches the image 216 presented on the WVS credential interface 210, the website 108 can be trusted. If not, the website 108 cannot be trusted.

Figure 3:
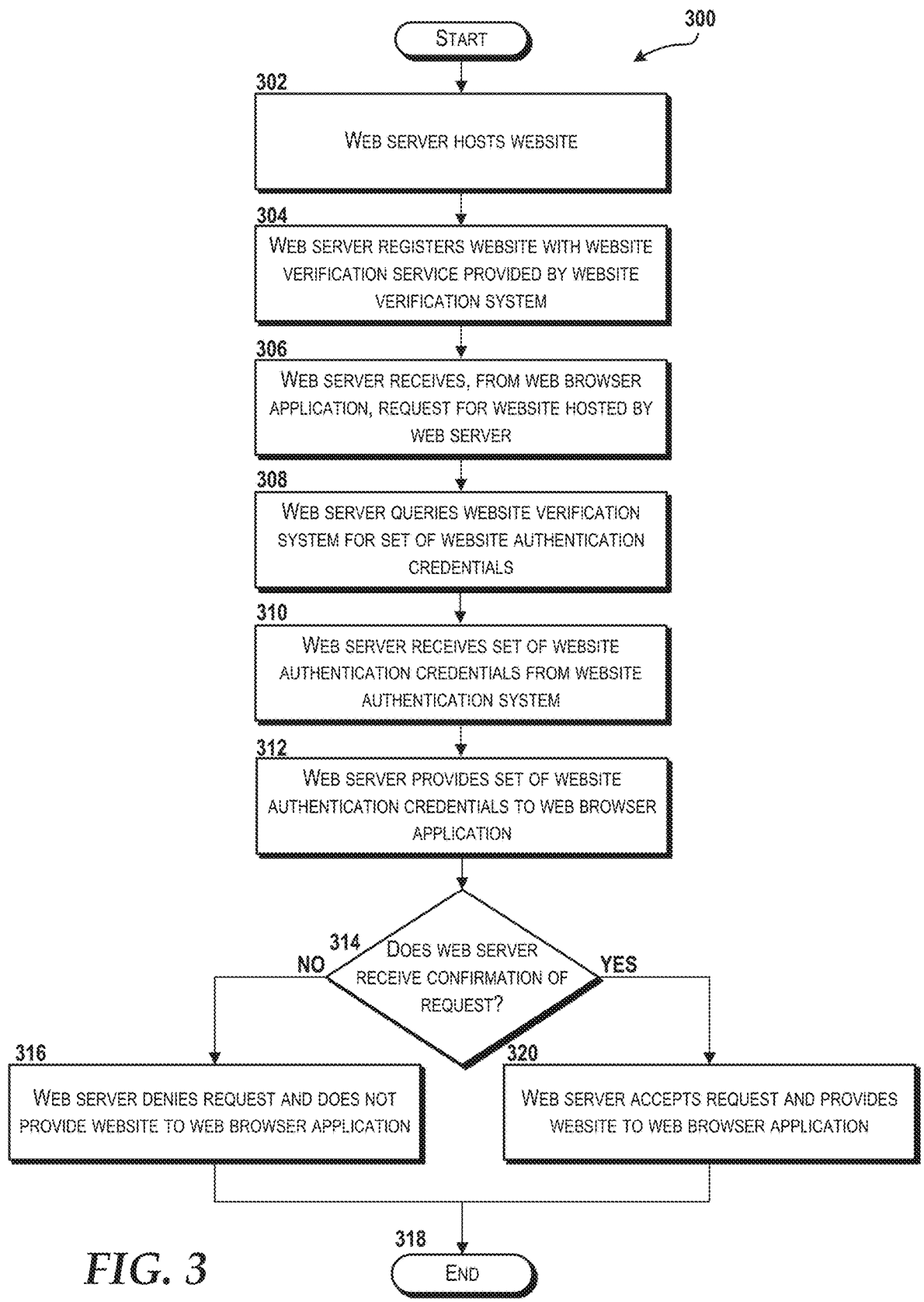
FIG. 3 is a flow diagram illustrating aspects of a method for implementing a website verification service ("WVS") from the perspective of a web server, according to an illustrative embodiment.

Turning now to FIG. 3, a flow diagram illustrating aspects of a method 300 for implementing the WVS 124 will be described from the perspective of the web server 110, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the web browser device 104, the verifier device 106, the web server 110, the website verification system 126, and/or one or more other computing systems, network components, and/or devices disclosed herein to perform operations.

For purposes of illustrating and describing some of the concepts of the present disclosure, the methods disclosed herein are described as being performed, at least in part, by the web browser device 104, the verifier device 106, the web server 110, the website verification system 126, as labeled, via execution, by one or more processing components, of one or more software modules, applications, and/or other software such as the web browser application 114, the other application(s) 116, the WVS module 118, the verifier application 120, the WVS credential generator 130, the WVS timer 132, the WVS website registrar, or some combination thereof. It should be understood that additional and/or alternative devices can provide the functionality described herein via execution of one or more modules, applications, and/or other software. Thus, the illustrated embodiments are illustrative, and should not be viewed as being limiting in any way.

The method 300 will be described with additional reference to FIG. 1. The method 300 begins and proceeds to operation 302. At operation 302, the web server 110 hosts the website 108. The web server 110 can host all or a portion of the website 108. If the web server 110 hosts only a portion of the website 108, the web server 110 can communicate with one or more other servers, database, data stores, and/or other components provided by a web hosting service. The web server 110 may host one or more other websites 108 in addition to the website 108. For ease of explanation, and not limitation, the web server 110 will be described as a single server configured to host a single website.

From operation 302, the method 300 proceeds to operation 304. At operation 304, the web server 110 registers the website 108 with the WVS 124 provided by the website verification system 126. As part of the WVS 124, the web server 110 can register the website 108 for the WVS 124 via the WVS website registrar 134. The WVS website registrar 134 can store information that identifies the website 108 (e.g., one or more web links 127) and/or the web server 110 (e.g., one or more IP addresses) in association with other data.

From operation 304, the method 300 proceeds to operation 306. At operation 306, the web server 110 receives, from the web browser application 114 executing on the web browser device 104, a request for the website 108 hosted by the web server 110. The method 300 then proceeds to operation 308, where, in response to the request, the web server 110 queries the website verification system 126 for a set of website authentication credentials 128. From operation 308, the method 300 proceeds to operation 310, where the web server 110 receives the set of authentication credentials 128 from the website verification system 126.

From operation 310, the method 300 proceeds to operation 312. At operation 312, the web server 110 provides the set of authentication credentials 128 to the web browser application 114. The web browser application 114 can present the set of authentication credentials 128 to the user 102. From operation 312, the method 300 proceeds to operation 314, where the web server 110 determines if the user 102 has confirmed the request for the website 108. This determination can be based upon the user's 102 analysis of the set of authentication credentials 128 presented via the web browser application 114 matching the set of authentication credentials 128 presented via the verifier application 120 executing on the verifier device 106. If not, the method 300 proceeds to operation 316, where the web server 110 denies the request for the website 108 and does not provide the website 108 to the web browser application 114. The method 300 can then proceed to operation 318. The method 300 can end at operation 318. If, however, the web server 110 determines that the user 102 has confirmed the request for the website 108, the web server 110 accepts the request for the website 108 and provides the website 108 to the web browser application 114. From operation 320, the method 300 proceeds to operation 318, where the method 300 can end.

Figure 4:
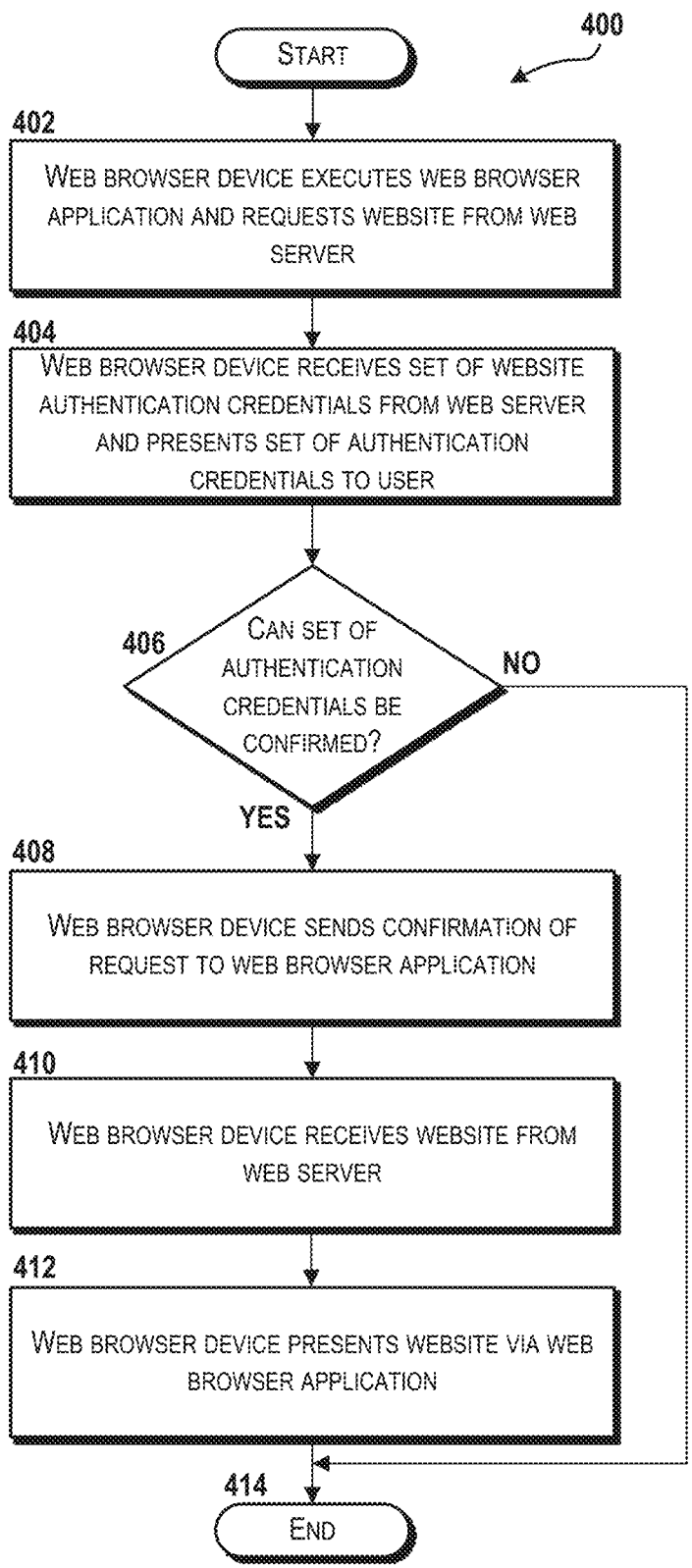
FIG. 4 is a flow diagram illustrating aspects of a method for implementing the WVS from the perspective of a web browser device, according to an illustrative embodiment.

Turning now to FIG. 4, a flow diagram illustrating aspects of a method 400 for implementing the WVS 124 will be described from the perspective of the browser device 104, according to an illustrative embodiment. The method 400 begins and proceeds to operation 402, where the browser device 104 executes the web browser application 114 and requests the website 108 from the web server 110. In particular, the user 102 may enter, click, select, or otherwise provide the web link 127 to the web browser application 114 which causes the web browser application 114 to request the website 108 from the web server 110 as identified in the web link 127.

From operation 402, the method 400 proceeds to operations 404. At operation 404, the web browser device 104 receives the set of authentication credentials 128 from the web server 110 and presents the set of authentication credentials 128 to the user 102. From operation 404, the method 400 proceeds to operation 406, where it is determined if the set of authentication credentials 128 can be confirmed. This determination can be based upon the user's 102 analysis of the set of authentication credentials 128 presented via the web browser application 114 matching the set of authentication credentials 128 presented via the verifier application 120 executing on the verifier device 106. Additional details in this regard are described from the perspective of the verifier device 106 with reference to FIG. 6. If the set of authentication credentials 128 can be confirmed, the website 108 is considered to be trustworthy, and the method 400 proceeds to operation 408. At operation 408, the web browser device 104 sends confirmation of the request to the web browser application 114.

From operation 408, the method 400 proceeds to operation 410, where the web browser device 104 receives the website 108 from the web server 110. The method 400 then proceeds to operation 412, where the web browser device 104 presents the website 108 via the web browser application 114. From operation 412, the method 400 can proceed to operation 414. The method 400 can end at operation 414. Also, if at operation 406, the set of authentication credentials 128 cannot be confirmed, the method 400 can proceed directly to operation 414 and the method 400 can end.

Figure 5:
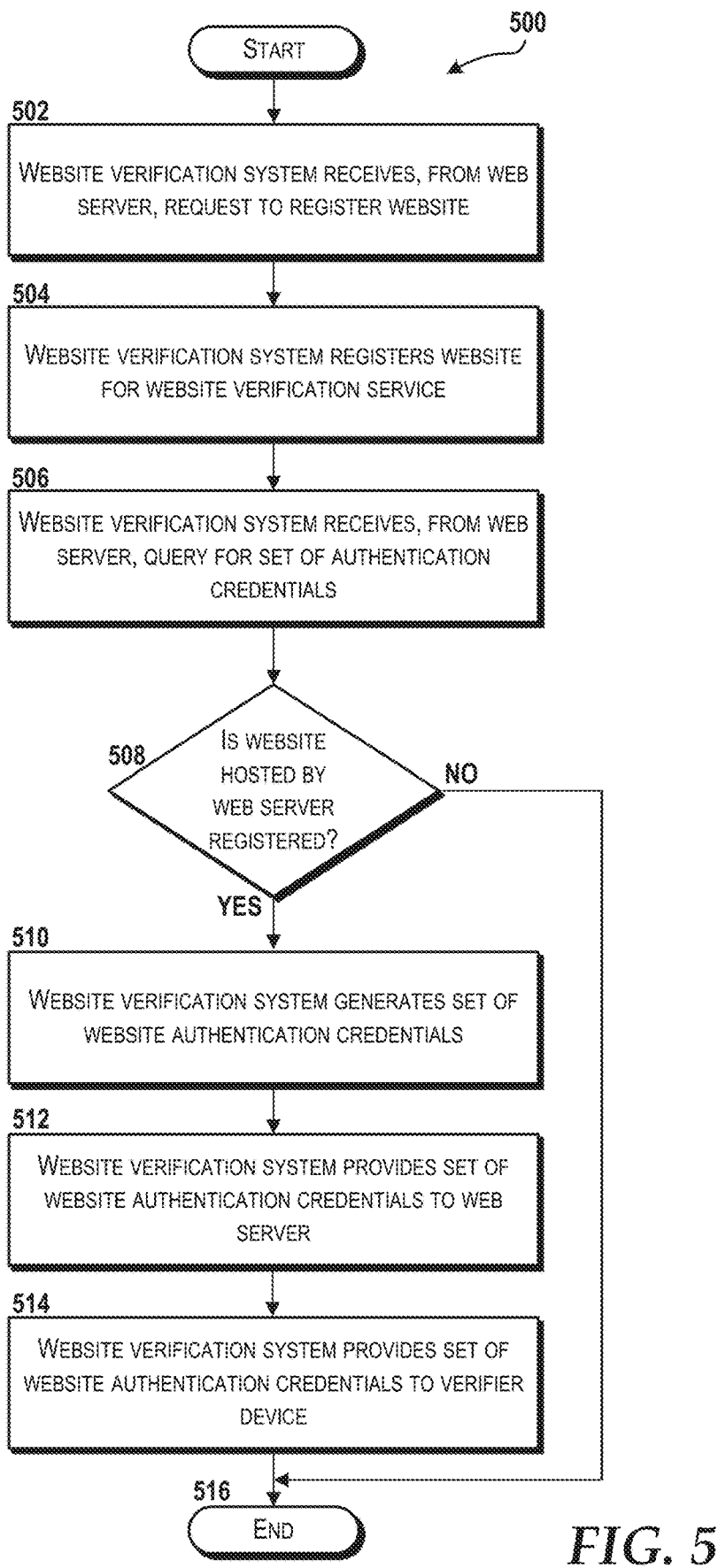
FIG. 5 is a flow diagram illustrating aspects of a method for implementing the WVS from the perspective of a website verification system, according to an illustrative embodiment.

Turning now to FIG. 5, a flow diagram illustrating aspects of a method 500 for implementing the WVS 124 will be described from the perspective of the website verification system 126, according to an illustrative embodiment. The method 500 begins and proceeds to operation 502. At operation 502, the website verification system 126 receives, from the web server 110, a request to register the website 108. From operation 502, the method 500 proceeds to operation 504, where the website verification system 126 registers the website 108 for the WVS 124.

From operation 504, the method 500 proceeds to operation 506, where the website verification system 126 receives, from the web server 110, a query for a set of authentication credentials 128. This query is the same query described in operation 308 of the method 300 that is described from the perspective of the web server 110. In response to the query, at operation 508, the website verification system 126 determines if the website 108 hosted by the web server 110 is registered. In particular, the website verification system 126 can query the WVS website registrar 134 based upon the web link 127 associated with the website and/or the IP address associated with the web server 110 to determine if the website 108 has been registered. In this example, the website 108 was registered at operation 504, and therefore the method 500 proceeds to operation 510.

At operation 510, the website verification system 126 generates a set of website authentication credentials 128. The WVS credential generator 130 can generate the website authentication credentials 128 using a random generator that randomly generates combinations of codes and pictures. A code, as noted above, can include any combination of letters, numbers, characters, and/or symbols. A picture can be randomly generated from pre-defined assets. Alternatively, the picture may be selected from repository of images that is stored locally by the website verification system 126 or remotely accessible by the website verification system 126 such as via an image database stored on or in association with another system that is accessible directly by the website verification system 126 via a communications link, via HTTP, or some other method. The WVS credential generator 130 can generate the website authentication credentials 128 via selection of pre-determined credentials (e.g., codes and pictures as described above). Those skilled in the art will appreciate the numerous ways the WVS credential generator 130 may generate specific types of website authentication credentials 128. As such, the examples provided herein should not be construed as being limiting in any way.

In some embodiments, the WVS credential generator 130 is configured to apply steganography or other security mechanism to strengthen the verification process for picture-based verification. In some embodiments, the WVS credential generator 130 uses temporal data and/or metadata to increase security of the website authentication credentials 128 and to make it more difficult for artificial intelligence systems to defeat the WVS 124. In some embodiments, the WVS credential generator 130 creates a temporal sequence that can include a set of pictures depicting one or more objects changing over time. For example, the set of pictures might include pictures depicting the process over time of a tadpole becoming a frog or a baby becoming a toddler, a teenager, and eventually an adult. In this manner, additional security can be provided if any one or more of the pictures in a given sequence is/are compromised. In some other embodiments, the WVS credential generator 130 creates a relative size comparison of objects depicted in a set of pictures. For example, the set of pictures might include pictures depicting the sun as being larger than Jupiter which is larger than Earth which is larger than the moon. As mentioned above, the website authentication credentials 128 can include a sound, and in some embodiments, the sound accompanies a picture. For example, a picture of a cow might be accompanied by a "moo" sound. As also mentioned above, the website authentication credentials 128 can include a tactile output, which may be embodied as a sequence of dots represented by buzzes of varying strength and/or length. In embodiments where temporal sequencing is used, the WVS 124 and the verifier device 106 can be synchronized, at least in part, via the WVS timer 132 maintained by the website verification system 126.

From operation 510, the method 500 proceeds to operation 512. At operation 512, the website verification system 126 provides the set of website authentication credentials 128 that was generated at operation 510 to the web server 110. From operation 512, the method 500 proceeds to operation 514, where the website verification system 126 also provides the set of website authentication credentials to the verifier device 106.

From operation 514, the method 500 can proceed to operation 516. The method 500 can end at operation 516. Also, if at operation 508, the website verification system 126 determines that the website 108 hosted by the web server 110 is not registered, the method 500 can proceed directly to operation 516 and the method 500 can end.

Figure 6:
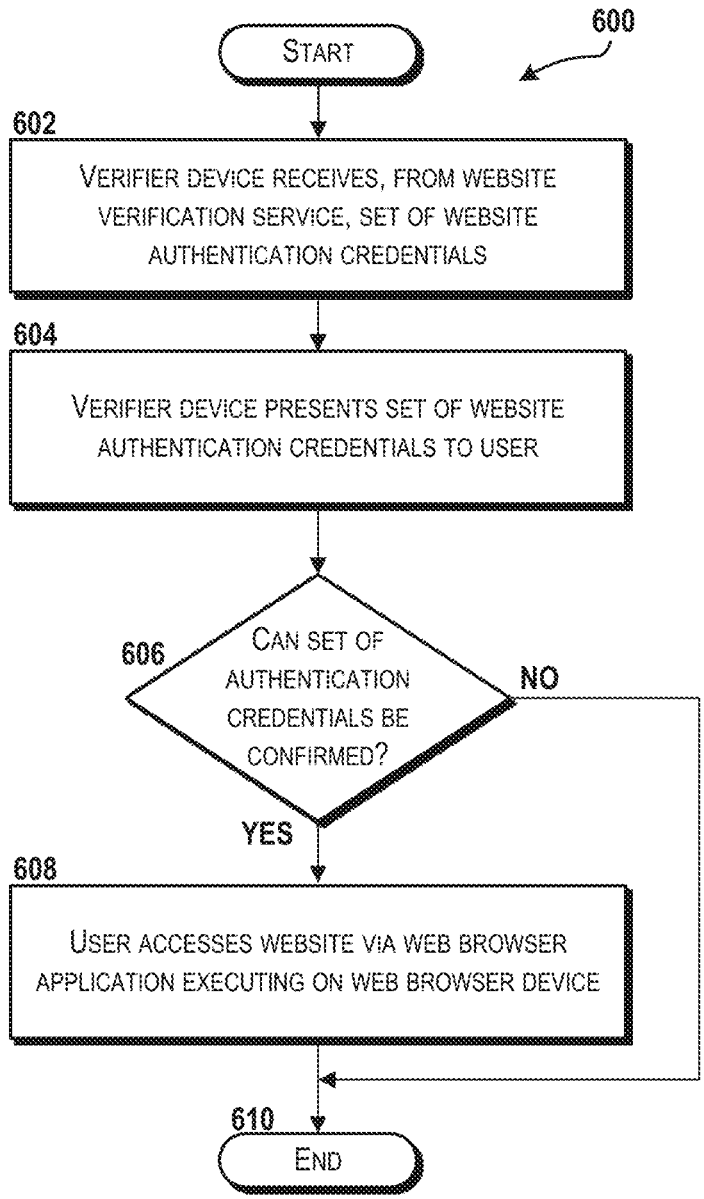
FIG. 6 is a flow diagram illustrating aspects of a method for implementing the WVS from the perspective of a verifier device, according to an illustrative embodiment.

Turning now to FIG. 6, a flow diagram illustrating aspects of a method 600 for implementing the WVS 124 will be described from the perspective of the verifier device 106, according to an illustrative embodiment. The method 600 begins and proceeds to operation 602. At operation 602, the verifier device 106 receives, from the WVS 124, the set of website authentication credentials 128. From operation 602, the method 600 proceeds to operation 604, where the verifier device 106 presents the set of website authentication credentials 128 to the user 102 via the verifier application 120.

From operation 604, the method 600 proceeds to operation 606. At operation 606, it is determined if the set of authentication credentials 128 can be confirmed. For example, the user 102 can perceive (e.g., see, feel, and/or hear) the set of the authentication credentials 128 presented, by the verifier device 106, at operation 604, and determine if they match the set of authentication credentials 128 presented, by the web browser device 104, at operation 404 (FIG. 4). If the set of authentication credentials 128 can be confirmed, the method 600 proceeds from operation 606 to operation 608. At operation 608, the user 102 accesses the website 108 via the web browser application that is executing on the web browser device 104.

From operation 608, the method 600 proceeds to operation 610. The method 600 can end at operation 610. Also, if at operation 606, the set of authentication credentials 128 cannot be confirmed, the method 600 can proceed directly to operation 610 and the method 600 can end.

Figure 7:
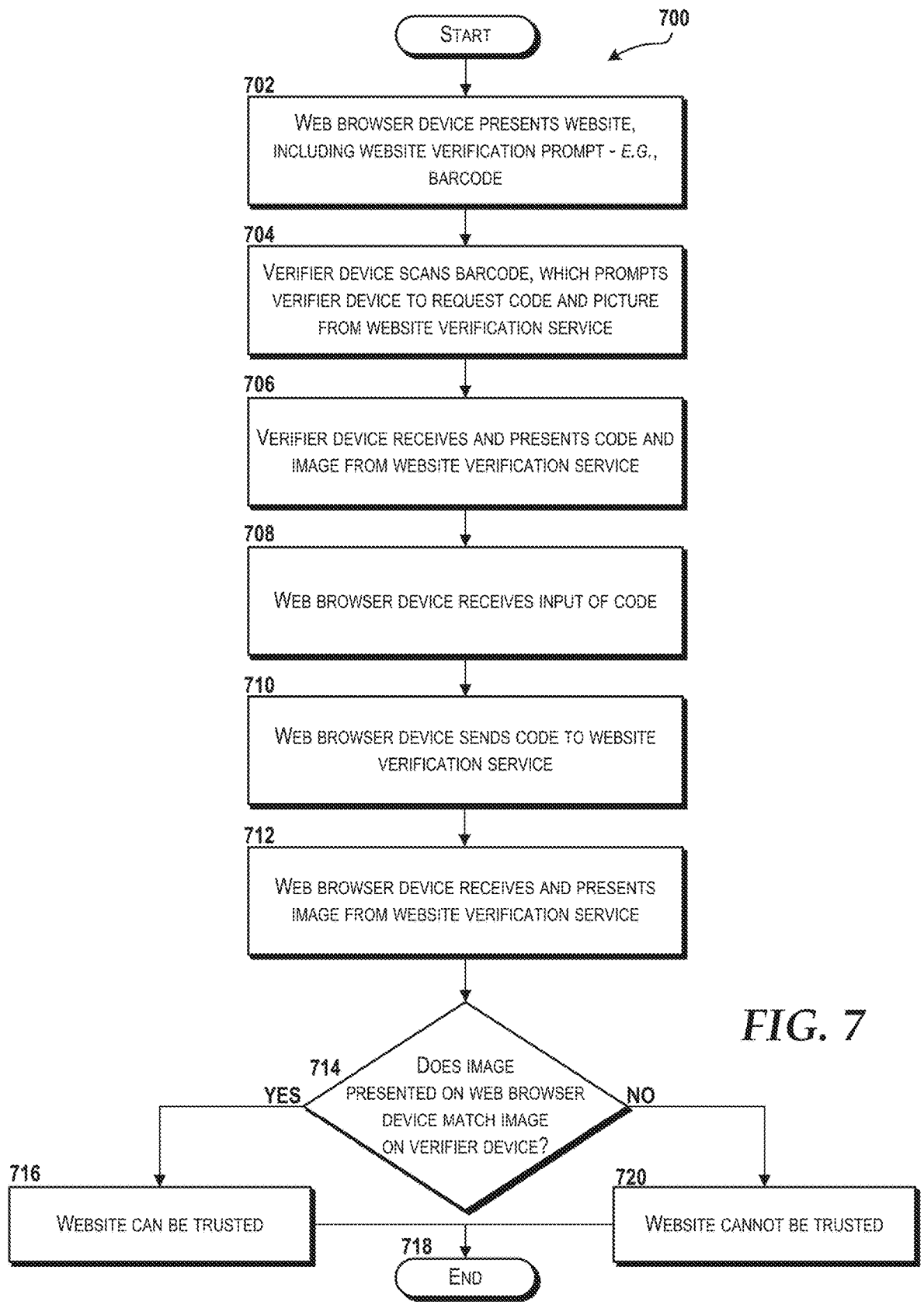
FIG. 7 is a flow diagram illustrating aspects of another method for implementing the WVS from the perspective the web browser device and the verifier device, according to an illustrative embodiment.

Turning now to FIG. 7, a flow diagram illustrating aspects of another method 700 for implementing the WVS 124 will be described from the perspective of both the web browser device 104 and the verifier device 106. The method 700 will be described with additional reference to FIGS. 2A-2D.

The method 700 begins and proceeds to operation 702. At operation 702, the web browser device 104 presents the website 108 and the WVS prompt 204 via the web browser application 114. The WVS prompt 204 (best shown in FIG. 2A) can be presented as a pop-up in which a new browser window is created for the WVS prompt 204. Alternatively, the WVS prompt 204 can be presented as an overlay on top of the website 108. The WVS prompt 204 can instead be embedded in the website 108. Where and how the WVS prompt 204 is presented to the user 102 can be a design choice. The presentation of the WVS prompt 204 can be a design choice and at least partially dictated by how the WVS 124 is being implemented (e.g., API call, plug-in, etc.). In the example illustrated in FIG. 2A, the WVS prompt 204 includes the 3D barcode 206 (also known as a QR code).

From operation 702, the method 700 proceeds to operation 704. At operation 704, the verifier device 106 scans the 3D barcode 206. This can prompt the verifier device 106 to request the set of authentication credentials 128 from the WVS 124. In this example, the set of authentication credentials 128 includes the numeric code 214 and the image 216 (best shown in FIG. 2C), although the set of authentication credentials 128 alternatively can include one or more authentication credentials 128 of any type and in any combination.

From operation 704, the method 700 proceeds to operation 706. At operation 706, the verifier device 106 receives and presents the numeric code 214 and the image 216. From operation 706, the method 700 proceeds to operation 708, where the web browser device 104 receives input of the numeric code 214 (best shown in FIG. 2C). From operation 708, the method 700 proceeds to operation 710, where the web browser device 104 sends the numeric code 214 to the WVS 124.

From operation 710, the method 700 proceeds to operation 712. At operation 712, the web browser device 104 receives and presents an image (which can be the image 216 or a different non-matching image) from the WVS 124. From operation 712, the method 700 proceeds to operation 714. At operation 714, it is determined if the image presented on the web browser device 104 matches the image presented on the verifier device 106. If the image presented on the web browser device 104 matches the image presented on the verifier device 106, the method 700 proceeds to operation 716. At operation 716, the user 102 can use this insight to determine that the website 108 can be trusted and can proceed using the website 108 knowing that the website 108 has been verified. From operation 716, the method 700 proceed to operation 718. The method 700 can end at operation 718. If, however, at operation 714, the image presented on the web browser device 104 does not match the image presented on the verifier device 106, the method 700 proceeds to operation 720. At operation 720, the user 102 can use this insight to determine that the website 108 cannot be trusted. From operation 720, the method 700 can proceed to operation 718 and the method 700 can end.

Figure 8:
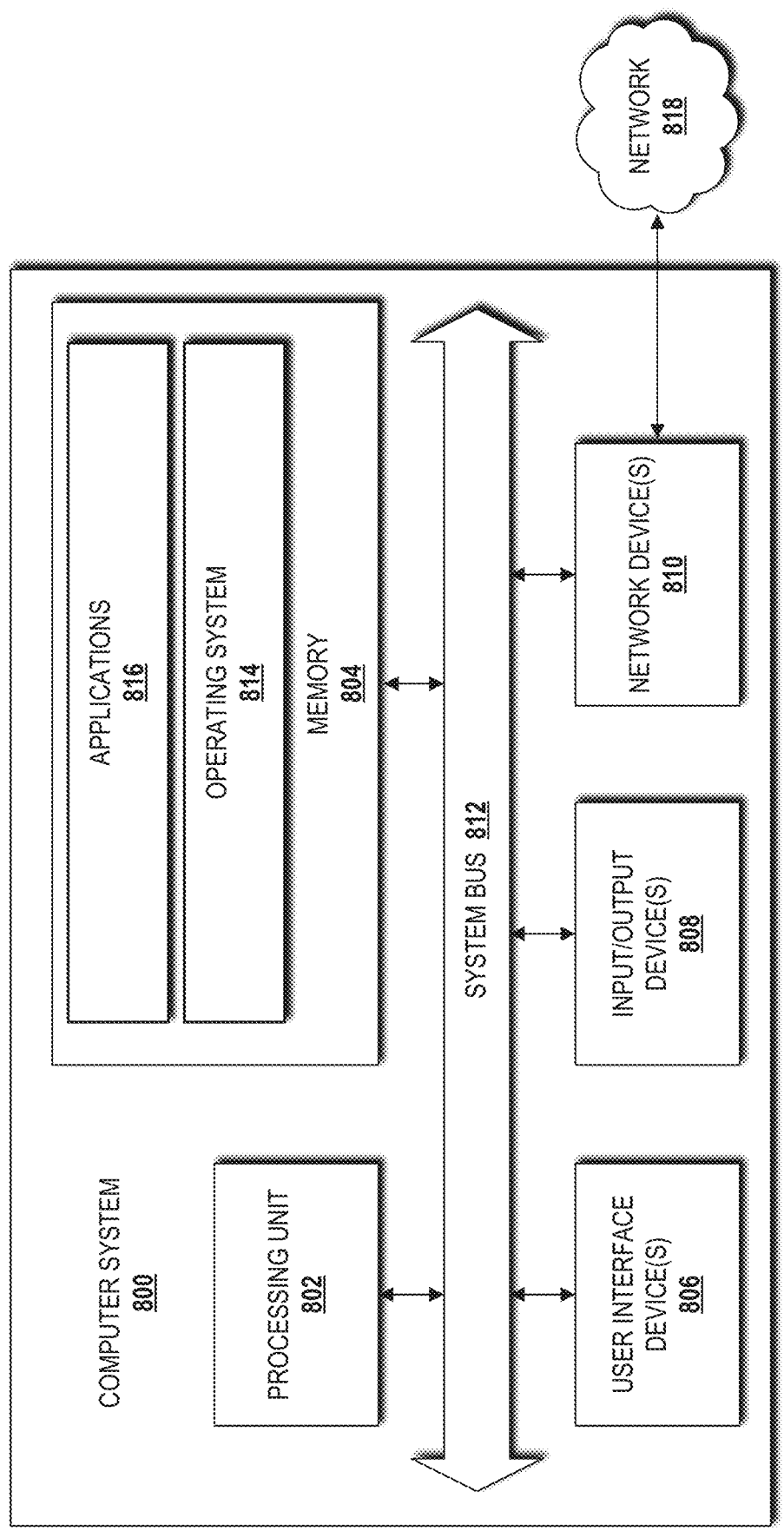
FIG. 8 is a block diagram illustrating an example computer system capable of implementing aspects of the embodiments presented herein.

FIG. 8 is a block diagram illustrating a computer system 800 configured to perform various operations disclosed herein. The computer system 800 includes a processing unit 802, a memory 804, one or more user interface devices 806, one or more input/output ("I/O") devices 808, and one or more network devices 810, each of which is operatively connected to a system bus 812. The system bus 812 enables bi-directional communication between the processing unit 802, the memory 804, the user interface devices 806, the I/O devices 808, and the network devices 810.

In some embodiments, the web browser device 104, the verifier device 106, the web server 110, the website verification system 126, or some combination thereof is/are configured, at least in part, like the computer system 800. It should be understood, however, that the web browser device 104, the verifier device 106, the web server 110, and/or the website verification system 126 might include additional functionality or include less functionality than now described.

The processing unit 802 might be a standard central processor that performs arithmetic and logical operations, a more specific purpose programmable logic controller ("PLC"), a programmable gate array, or other type of processor known to those skilled in the art and suitable for controlling the operation of the computer system 800. Processing units are generally known, and therefore are not described in further detail herein.

The memory 804 communicates with the processing unit 802 via the system bus 812. In some embodiments, the memory 804 is operatively connected to a memory controller (not shown) that enables communication with the processing unit 802 via the system bus 812. The illustrated memory 804 includes an operating system 814 and one or more applications 816. The operating system 814 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like. The applications 816 can include the web browser application 114, the other application(s) 116, the WVS module 118, the verifier application 120, the WVS credential generator 130, the WVS timer 132, and/or the WVS website registrar 134.

The user interface devices 806 may include one or more devices with which a user accesses the computer system 800. The user interface devices 806 may include, but are not limited to, computers, servers, personal digital assistants, telephones (e.g., cellular, IP, or landline), or any suitable computing devices. The I/O devices 808 enable a user to interface with the program modules. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, a touchscreen, or an electronic stylus. Further, the I/O devices 808 may include one or more output devices, such as, but not limited to, a display screen or a printer. An I/O device 808 embodied as a display screen can be used to present information to the user 102. For example, the website authentication credential(s) 128, the website 108, the WVS prompt 204, the 3D barcode 206, the web browser application UI 202, the verifier application UI 208, the WVS credential interface 210, the code field 212, the numeric code 214, the image 216, and/or other information can be presented to the user 102 via the I/O device 808.

The network devices 810 enable the computer system 800 to communicate with a network 818, which can be or can include the network 112. Examples of the network devices 810 include, but are not limited to, a modem, a radio frequency ("RF") or infrared ("IR") transceiver, a telephonic interface, a bridge, a router, or a network card. The network 818 may include a wireless network such as, but not limited to, a WLAN such as a WI-FI network, a WWAN, a wireless PAN ("WPAN") such as BLUETOOTH, or a wireless MAN ("WMAN"). Alternatively, the network 818 may be a wired network such as, but not limited to, a WAN such as the Internet, a LAN such as the Ethernet, a wired PAN, or a wired MAN.

Figure 9:
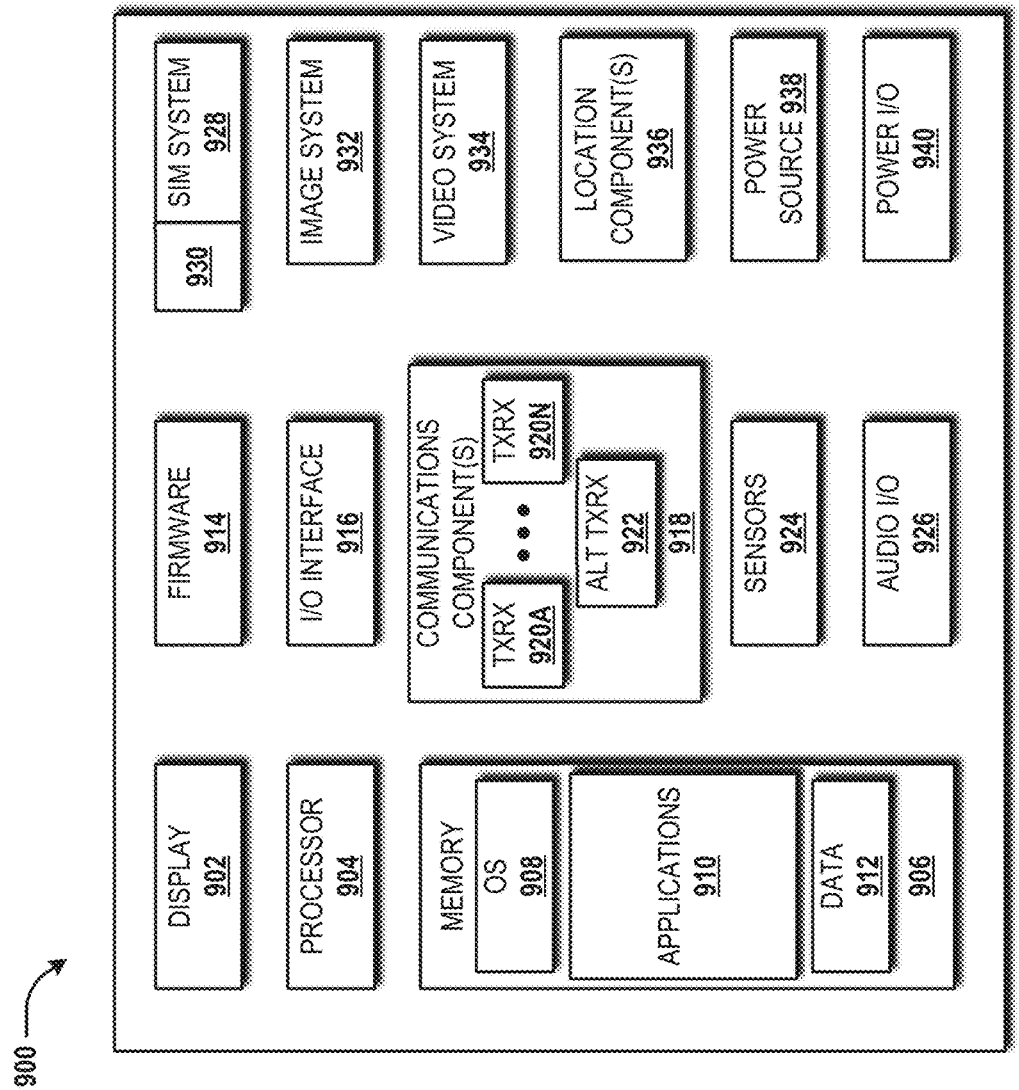
FIG. 9 is a block diagram illustrating an example mobile device capable of implementing aspects of the embodiments disclosed herein.

Turning now to FIG. 9, an illustrative mobile device 900 and components thereof will be described. In some embodiments, the web browser device 104, the verifier device 106, the web server 110, the website verification system 126, or some combination thereof is/are configured, at least in part, like the mobile device 900. It should be understood, however, that the web browser device 104, the verifier device 106, the web server 110, and/or the website verification system 126 might include additional functionality or include less functionality than now described.

While connections are not shown between the various components illustrated in FIG. 9, it should be understood that some, none, or all of the components illustrated in FIG. 9 can be configured to interact with one another to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display the website authentication credential(s) 128, the website 108, the WVS prompt 204, the 3D barcode 206, the web browser application UI 202, the verifier application UI 208, the WVS credential interface 210, the code field 212, the numeric code 214, the image 216, network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910, other computer-executable instructions stored in the memory 906, or the like. In some embodiments, the applications 910 also can include a UI application (not illustrated in FIG. 9). In some embodiments, the applications 910 can include the web browser application 114, the other application(s) 116, the WVS module 118, the verifier application 120, the WVS credential generator 130, the WVS timer 132, and/or the WVS website registrar 134.

The UI application can interface with the operating system 908 to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in data communications, entering/deleting data, entering and setting user IDs and passwords for device access, configuring settings, manipulating content and/or settings, multimode interaction, interacting with other applications 910, and otherwise facilitating user interaction with the operating system 908, the applications 910, and/or other types or instances of data 912 that can be stored at the mobile device 900.

The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments, one or more of the transceivers of the communications component 918 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 918 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 918 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-920N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 900 or other devices or computers described herein, such as the computer system 800 described above with reference to FIG. 8. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 900 in order to store and execute the software components presented herein. It is also contemplated that the mobile device 900 may not include all of the components shown in FIG. 9, may include other components that are not explicitly shown in FIG. 9, or may utilize an architecture completely different than that shown in FIG. 9.

Figure 10:
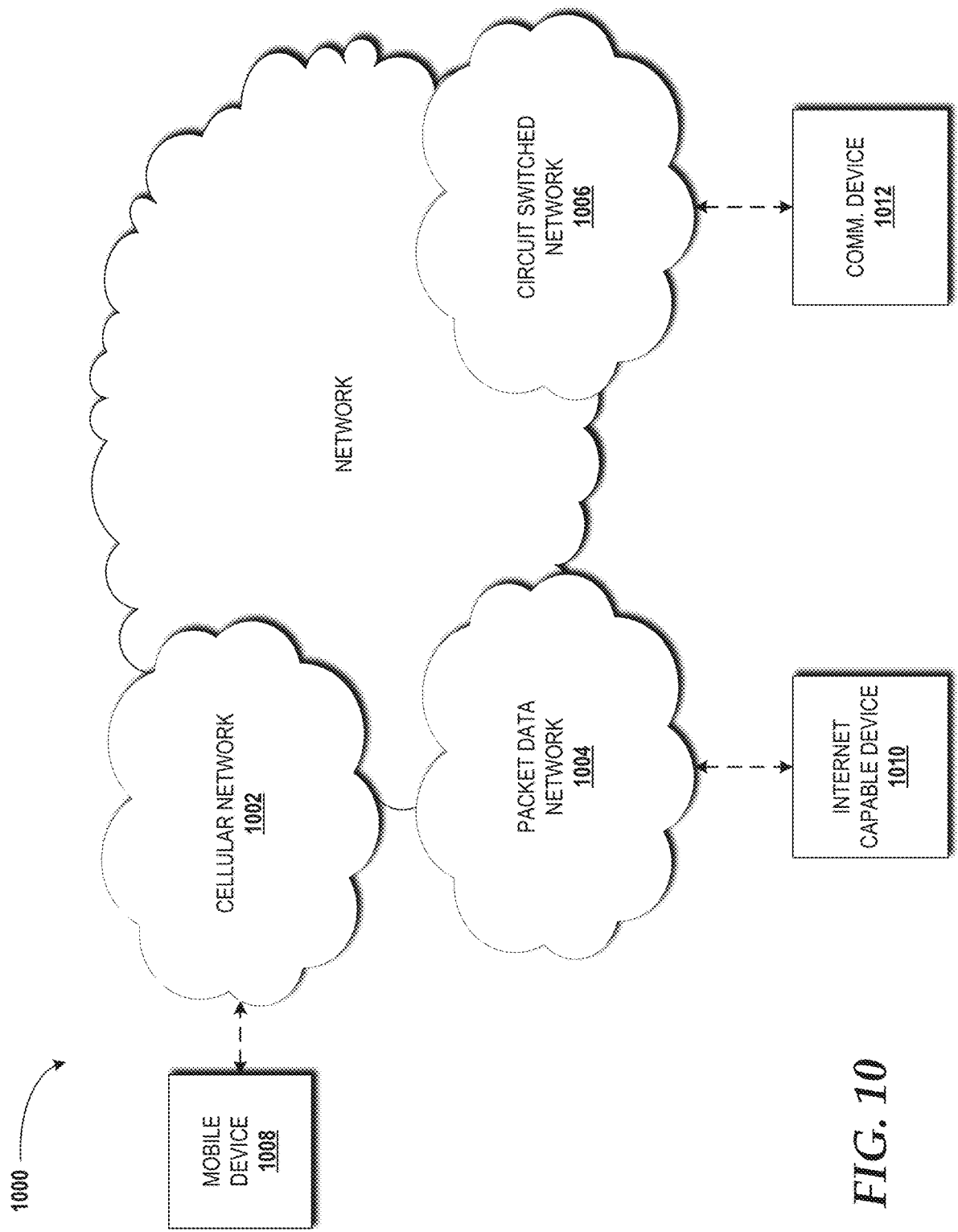
FIG. 10 is a diagram illustrating a network, according to an illustrative embodiment.

Turning now to FIG. 10, details of a network 1000 are illustrated, according to an illustrative embodiment. The network 112 (FIG. 1) can be or can include at least a portion of the network 1000. The network 1000 includes a cellular network 1002, a packet data network 1004, and a circuit switched network 1006 (e.g., a public switched telephone network).

The cellular network 1002 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 1002 also includes radios and nodes for receiving and transmitting voice, data, and combinations thereof to and from radio transceivers, networks, the packet data network 1004, and the circuit switched network 1006.

A mobile communications device 1008, such as, for example, a cellular telephone, a user equipment, a mobile terminal, a PDA, a laptop computer, a handheld computer, the web browser device 104, the verifier device 106, and combinations thereof, can be operatively connected to the cellular network 1002. The cellular network 1002 can be configured as a GSM) network and can provide data communications via GPRS and/or EDGE. Additionally, or alternatively, the cellular network 1002 can be configured as a 3G Universal Mobile Telecommunications System ("UMTS") network and can provide data communications via the HSPA protocol family, for example, HSDPA, EUL, and HSPA+. The cellular network 1002 also is compatible with 4G mobile communications standards such as LTE, or the like, as well as evolved and future mobile standards.

The packet data network 1004 includes various devices, for example, the web server 110, the web verification system 126, other servers, other systems, computers, databases, and other devices in communication with one another, as is generally known. In some embodiments, the packet data network 1004 is or includes one or more WI-FI networks, each of which can include one or more WI-FI access points, routers, switches, and other WI-FI network components. The packet data network 1004 devices are accessible via one or more network links. The servers often store various files that are provided to a requesting device such as, for example, the web browser device 104, the verifier device 106, a computer, a terminal, a smartphone, or the like. Typically, the requesting device includes software (e.g., the web browser application 114) for executing a web page in a format readable by the browser or other software. Other files and/or data may be accessible via "links" in the retrieved files, as is generally known. In some embodiments, the packet data network 1004 includes or is in communication with the Internet. The circuit switched network 1006 includes various hardware and software for providing circuit switched communications. The circuit switched network 1006 may include, or may be, what is often referred to as a plain old telephone system ("POTS"). The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable devices 1010, for example, the web browser device 104, the verifier device 106, the website verification system 126, the web server 110, a PC, a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010.

Figure 11:
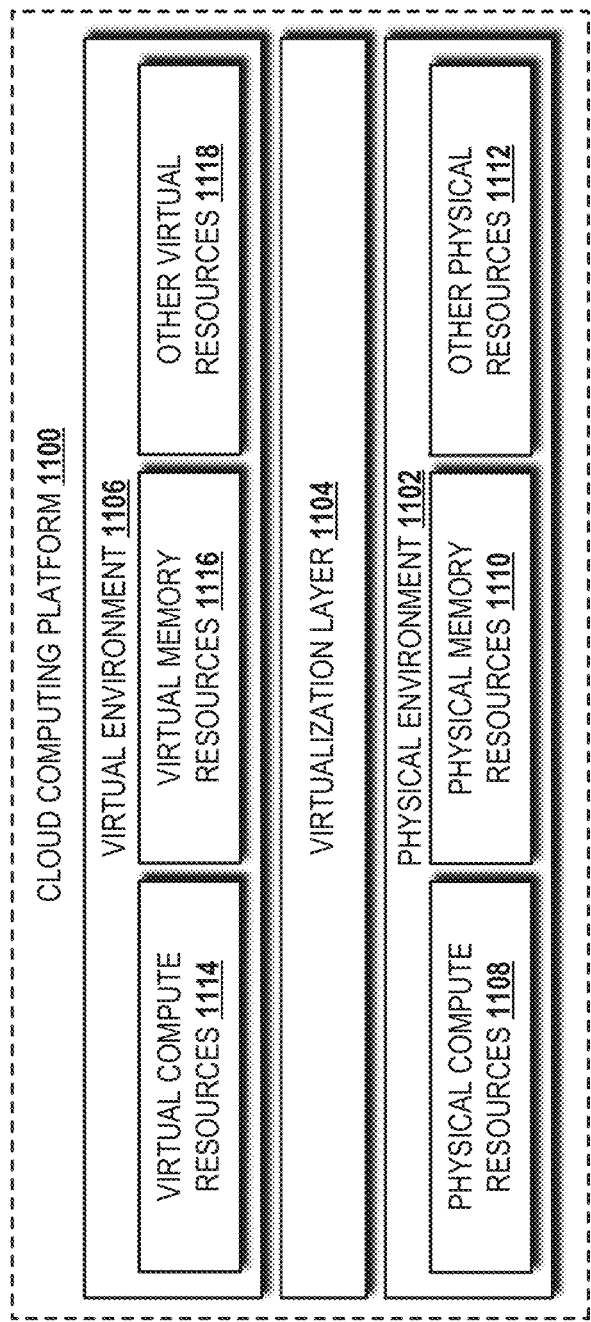
FIG. 11 is a diagram illustrating a cloud computing platform capable of implementing aspects of the embodiments disclosed herein.

Turning now to FIG. 11, an illustrative cloud computing platform 1100 will be described, according to an illustrative embodiment. The web browser device 104, the verifier device 106, the web server 110, the website verification system 126, and/or other networks, systems, and/or devices disclosed herein can be implemented and/or controlled, at least in part, in/by the cloud environment 1100.

The cloud computing platform 1100 includes a physical environment 1102, a virtualization layer 1104, and a virtual environment 1106. While no connections are shown in FIG. 11, it should be understood that some, none, or all of the components illustrated in FIG. 11 can be configured to interact with one other to carry out various functions described herein. In some embodiments, the components are arranged so as to communicate via one or more networks. Thus, it should be understood that FIG. 11 and the remaining description are intended to provide a general understanding of a suitable environment in which various aspects of the embodiments described herein can be implemented, and should not be construed as being limiting in any way.

The physical environment 1102 provides hardware resources that, in the illustrated embodiment, include one or more physical compute resources 1108, one or more physical memory resources 1110, and one or more other physical resources 1112. The physical compute resource(s) 1108 can include one or more hardware components that perform computations to process data and/or to execute computer-executable instructions of one or more application programs, one or more operating systems, and/or other software. The physical compute resources 1108 can include one or more central processing units ("CPUs") configured with one or more processing cores. The physical compute resources 1108 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 1108 can include one or more discrete GPUs. In some other embodiments, the physical compute resources 1108 can include CPU and GPU components that are configured in accordance with a co-processing CPU/GPU computing model, wherein the sequential part of an application executes on the CPU and the computationally-intensive part is accelerated by the GPU processing capabilities. The physical compute resources 1108 can include one or more system-on-chip ("SoC") components along with one or more other components, including, for example, one or more of the physical memory resources 1110, and/or one or more of the other physical resources 1112. In some embodiments, the physical compute resources 1108 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The physical compute resources 1108 can be or can include one or more hardware components architected in accordance with an ARM architecture, available for license from ARM HOLDINGS of Cambridge, United Kingdom. Alternatively, the physical compute resources 1108 can be or can include one or more hardware components architected in accordance with an x86 architecture, such an architecture available from INTEL CORPORATION of Mountain View, California, and others. Those skilled in the art will appreciate the implementation of the physical compute resources 1108 can utilize various computation architectures, and as such, the physical compute resources 1108 should not be construed as being limited to any particular computation architecture or combination of computation architectures, including those explicitly disclosed herein.

The physical memory resource(s) 1110 can include one or more hardware components that perform storage/memory operations, including temporary or permanent storage operations. In some embodiments, the physical memory resource(s) 1110 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 1108.

The other physical resource(s) 1112 can include any other hardware resources that can be utilized by the physical compute resources(s) 1108 and/or the physical memory resource(s) 1110 to perform operations described herein. The other physical resource(s) 1112 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 1102 can be virtualized by one or more virtual machine monitors (not shown; also known as "hypervisors") operating within the virtualization/control layer 1104 to create virtual resources that reside in the virtual environment 1106. The virtual machine monitors can be or can include software, firmware, and/or hardware that alone or in combination with other software, firmware, and/or hardware, creates and manages virtual resources operating within the virtual environment 1106.

The virtual resources operating within the virtual environment 1106 can include abstractions of at least a portion of the physical compute resources 1108, the physical memory resources 1110, and/or the other physical resources 1112, or any combination thereof, shown as virtual compute resources 1114, virtual memory resources 1116, and other virtual resources 1118, respectively. In some embodiments, the abstractions can include one or more virtual machines upon which one or more applications can be executed.

Based on the foregoing, it should be appreciated that concepts and technologies for a website verification service have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. A method comprising:
   receiving, by a web site verification system comprising a processor, from a web server that hosts a website, a request to register the website;
   registering, by the web site verification system, the web site for a web site verification service;
   receiving, by the web site verification system, from a verifier device associated with a user, a query for a set of website authentication credentials to be used to verify that the website is trustworthy, wherein the verifier device provides the query for the set of web site authentication credentials to the web site verification system in response to scanning, by the verifier device, a prompt presented to the user via a web browser application executing on a web browser device;
   generating, by the website verification system, the set of web site authentication credentials, wherein the set of web site authentication credentials comprises a code and an image, wherein the set of web site authentication credentials are generated by a web site verification service credential generator using a random generator;
   providing, by the web site verification system, the set of web site authentication credentials to the verifier device associated with the user;
   receiving, by the web site verification system, from the web browser device, the code of the set of web site authentication credentials; and
   in response to receiving the code of the set of web site authentication credentials from the web browser device, providing, by the web site verification system, the image of the set of web site authentication credentials to the web browser device, wherein the image of the set of website authentication credentials presented to the user via the web browser device and the image of the set of web site authentication credentials presented to the user by the verifier device are used to verify that the web site is trustworthy.

2. The method of claim 1, further comprising in response to receiving the query for the set of web site authentication credentials from the verifier device, determining if the web site is registered for the website verification service.

3. The method of claim 2, wherein determining if the web site is registered for the website verification service comprises querying a web site verification service web site registrar based on a web link associated with the website.

4. The method of claim 1, wherein the prompt presented to the user via the web browser application executing on the web browser device notifies the user that the website is protected by the web site verification service.

5. The method of claim 1, wherein the web browser device receives the code of the set of web site authentication credentials via input from the user based on the set of website authentication credentials presented to the user by the verifier device.

6. The method of claim 1, wherein if the image of the set of website authentication credentials presented to the user via the web browser device matches the image of the set of website authentication credentials presented to the user by the verifier device, an authenticity of the website is verified.

7. A non-transitory computer-readable storage medium having computer-executable instructions stored thereon that, when executed by a processor of a website verification system, cause the web site verification system to perform operations comprising:
receiving, from a web server that hosts a website, a request to register the web site;
registering the website for a web site verification service;
receiving, from a verifier device associated with a user, a query for a set of website authentication credentials to be used to verify that the website is trustworthy, wherein the verifier device provides the query for the set of website authentication credentials to the website verification system in response to scanning, by the verifier device, a prompt presented to the user via a web browser application executing on a web browser device;
generating the set of website authentication credentials, wherein the set of website authentication credentials comprises a code and an image, wherein the set of website authentication credentials are generated by a website verification service credential generator using a random generator;
providing the set of web site authentication credentials to the verifier device associated with the user;
receiving, from the web browser device, the code of the set of website authentication credentials; and
in response to receiving the code of the set of web site authentication credentials from the web browser device, providing the image of the set of website authentication credentials to the web browser device, wherein the image of the set of website authentication credentials presented to the user via the web browser device and the image of the set of web site authentication credentials presented to the user by the verifier device are used to verify that the website is trustworthy.

8. The non-transitory computer-readable storage medium of claim 7, wherein the operations further comprise in response to receiving the query for the set of web site authentication credentials from the verifier device, determining if the website is registered for the web site verification service.

9. The non-transitory computer-readable storage medium of claim 8, wherein determining if the website is registered for the website verification service comprises querying a website verification service website registrar based on a web link associated with the website.

10. The non-transitory computer-readable storage medium of claim 7, wherein the prompt presented to the user via the web browser application executing on the web browser device notifies the user that the web site is protected by the web site verification service.

11. The non-transitory computer-readable storage medium of claim 7, wherein the web browser device receives the code of the set of web site authentication credentials via input from the user based on the set of web site authentication credentials presented to the user by the verifier device.

12. The non-transitory computer-readable storage medium of claim 7, wherein if the image of the set of web site authentication credentials presented to the user via the web browser device matches the image of the set of website authentication credentials presented to the user by the verifier device, an authenticity of the website is verified.

13. A web site verification system comprising:
a processor; and
a memory having computer-executable instructions stored thereon that, when executed by the processor, cause the processor to perform operations comprising:
receiving, from a web server that hosts a website, a request to register the web site,
registering the website for a web site verification service,
receiving, from a verifier device associated with a user, a query for a set of website authentication credentials to be used to verify that the website is trustworthy, wherein the verifier device provides the query for the set of website authentication credentials to the website verification system in response to scanning, by the verifier device, a prompt presented to the user via a web browser application executing on a web browser device,
generating the set of web site authentication credentials, wherein the set of website authentication credentials comprises a code and an image, wherein the set of website authentication credentials are generated by a website verification service credential generator using a random generator,
providing the set of web site authentication credentials to the verifier device associated with the user,
receiving, from the web browser device, the code of the set of website authentication credentials, and
in response to receiving the code of the set of web site authentication credentials from the web browser device, providing the image of the set of website authentication credentials to the web browser device, wherein the image of the set of website authentication credentials presented to the user via the web browser device and the image of the set of web site authentication credentials presented to the user by the verifier device are used to verify that the website is trustworthy.

14. The web site verification system of claim 13, wherein the operations further comprise in response to receiving the query for the set of website authentication credentials from the verifier device, determining if the web site is registered for the website verification service.

15. The website verification system of claim 14, wherein determining if the website is registered for the website verification service comprises querying a web site verification service web site registrar based on a web link associated with the website.

16. The website verification system of claim 13, wherein the prompt presented to the user via the web browser application executing on the web browser device notifies the user that the web site is protected by the website verification service.

17. The website verification system of claim 13, wherein the web browser device receives the code of the set of web site authentication credentials via input from the user based on the set of website authentication credentials presented to the user by the verifier device.

* * * * *